(12) United States Patent
Yamaura

(10) Patent No.: US 6,782,308 B2
(45) Date of Patent: Aug. 24, 2004

(54) ROBOT PERFORMING DANCE ALONG MUSIC

(75) Inventor: Atsushi Yamaura, Shizuoka-ken (JP)

(73) Assignee: Yamaha Corporation, Shizuoka (JP)

( * ) Notice: Subject to any disclaimer, the term of this patent is extended or adjusted under 35 U.S.C. 154(b) by 0 days.

(21) Appl. No.: 10/264,488

(22) Filed: Oct. 4, 2002

(65) Prior Publication Data

US 2003/0069669 A1 Apr. 10, 2003

(30) Foreign Application Priority Data

Oct. 4, 2001 (JP) .......................................... 2001-308454

(51) Int. Cl.[7] .............................................. G06F 19/00
(52) U.S. Cl. ........................ 700/245; 700/246; 700/250;
700/253; 700/257; 369/47.11; 369/47.12;
381/1; 381/87; 446/175; 704/225; 704/231;
463/7; 463/84; 463/610
(58) Field of Search ................................. 700/245, 246,
700/250, 253, 257; 463/7, 36, 34, 43; 369/47.11,
47.12, 30.07, 53.22, 69, 53.31, 124.07;
381/1, 87, 17, 97; 446/175; 704/225, 278,
308, 500, 233, 231, 236; 84/610, 612, 634,
666

(56) References Cited

U.S. PATENT DOCUMENTS 5,693,903 A * 12/1997 Heidorn et al. ................ 84/668
2002/0103759 A1 * 8/2002 Matsumoto et al. ........... 705/51
2002/0107591 A1 * 8/2002 Gabai et al. ................... 700/94

FOREIGN PATENT DOCUMENTS

JP 2001-239485 9/2001

OTHER PUBLICATIONS

Takanishi et al., Developement of an anthropomorphic flutist robot WF–3RII, 1996, IEEE, pp. 37–43.*
Sony Global Press Release, Sony devlops small biped entertainment robot, 2000, Internet, pp. 1–4.*
Suzuki et al., A mobile robot platform for music and dance performance, no date, pp. 1–4.*
Sony Global Press Release dated Sep. 5, 2001 and entitled, "New "AIBO" Entertainment Robots, "LATTE" and "MACARON" Join The AIBO Family"; http://www.sony.co.jp/en/SonyInfo/News/Press/200109/01-0905E/.

* cited by examiner

Primary Examiner—William A. Cuchlinski, Jr.
Assistant Examiner—McDieunel Marc
(74) Attorney, Agent, or Firm—Harness, Dickey & Pierce, PLC

(57) ABSTRACT

In a music information reproducing device 1, a music information reproducing unit 2 reads a music information file 6 stored in a storage unit 4 and reproduces it as consecutive audible sound signal to sound audible sounds from a loud speaker 5. The music information file 6 comprises predetermined music information that a robot can recognize by analyzing as an audible sound signal and that specifies a movement pattern data for making the robot perform a movement pattern and normal music information for reproducing music. The robot 2 is a human form or an animal form robot that moves each part of the robot 2 in accordance with the specified movement pattern. A robot that performs a movement pattern along music by inputting the music as an audible sound signal and a movement pattern control program of the robot is provided in a cheap price.

18 Claims, 6 Drawing Sheets

FIG.4A
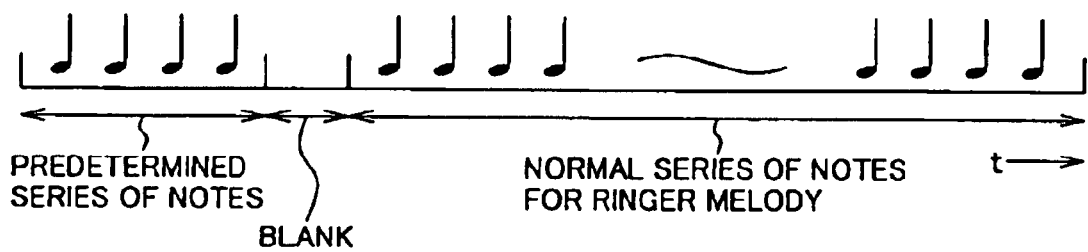
PREDETERMINED SERIES OF NOTES
BLANK
NORMAL SERIES OF NOTES FOR RINGER MELODY
t →
FIG.4B
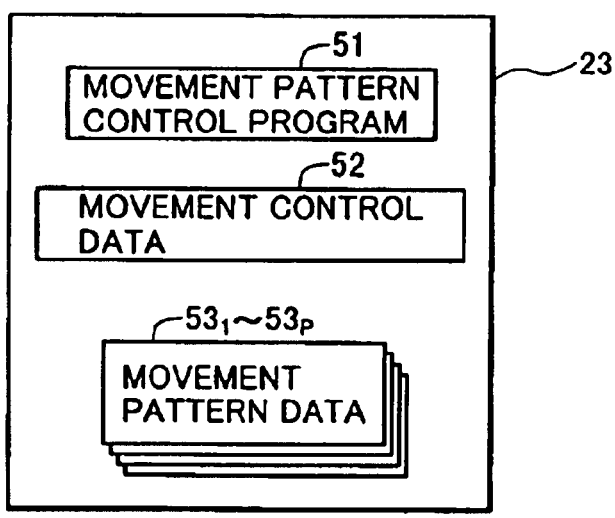
FIG.4C
| PREDETERMINED SERIES OF NOTES m | MOVEMENT PATTERN p | PERFORMING TEMPO t | PERFORMING TIME s |
|---|---|---|---|
| SERIES OF NOTES 1 | 1 | 100 | 40 sec |
| SERIES OF NOTES 2 | 2 | 80 | 25 sec |
| SERIES OF NOTES 3 | 1 | 120 | 30 sec |
| ⋮ | ⋮ | ⋮ | ⋮ |

ROBOT PERFORMING DANCE ALONG MUSIC

CROSS REFERENCE TO RELATED APPLICATION

This application is based on Japanese Patent Application 2001-308454, filed on Oct. 4, 2001, the entire contents of which are incorporated herein by reference.

BACKGROUND OF THE INVENTION

A) Field of the Invention

This invention relates to a robot that performs a movement pattern such as a dance along music, a movement pattern control program of the robot to perform the movement pattern, a music information file for the robot to perform the movement pattern such as the dance, a server device for providing this music information file, a communication terminal device to receive this music information file and a music information reproducing device to make the robot listen to this music information file.

B) Description of the Related Art

Conventionally, a device for making a robot listen to music and perform a movement such as a dance along the music is suggested. According to that, a dance movement signal embedded into a music signal constituting a synthesized sound in a state that a human being cannot recognize that the dance movement signal is radiated to the robot. The robot extracts the dance movement signal from the synthesized sound and performs a movement by move joints such as arms and legs etc. according to the dance movement signal.

As a dance movement signal, for example, a control signal using a data hiding technique is used. That is, "0" of the control signal is represented by removing a specific frequency signal in the sound signal, and "1" is represented by removing another specific frequency signal.

However, when a synthesized sound in which the dance movement signal is embedded is generated, a special technique "a data hiding technique" is necessary. Therefore, it is difficult to make a robot dance along music with an easy and cheap technique.

SUMMARY OF THE INVENTION

It is an object of the present invention to provide a robot that performs a movement pattern along music by inputting the music as an audible sound signal and a movement pattern control program of the robot in a cheap price.

Also, it is another object of the present invention to provide a music information file that can synchronize a movement pattern to be performed by a robot and music in a cheap price and being compatible with a conventional music information file.

Furthermore, it is further object of the present invention to provide a server apparatus for network providing of the music information file, a communication terminal device and a music information reproducing device to make a robot input the music information file as an audible sound signal.

According to one aspect of the present invention, there is provided a robot, comprising: a storage device that stores a movement pattern data to be specified by first music information; an input device that inputs, as an audible sound signal, a music information file comprising second music information for reproducing music and the first music information; a recognizing device that recognizes the first music information based on the input audible sound signal; and a movement performing device that performs a movement pattern in accordance with the movement pattern data specified by the first music information read from the storage device when the recognizing device recognizes the first music information.

According to another aspect of the present invention, there is provided a program, which a computer executes to realize a movement pattern control process for a robot, comprising the steps of: (a) inputting, as an audible sound signal, a music information file comprising first music information for specifying a movement pattern data or information directing the movement pattern data and a second music information for reproducing music; (b) analyzing the input audible sound signal to output a result of the analysis; (c) recognizing the first music information in accordance with the result of the analysis; (d) reading movement pattern data or information directing the movement pattern data in accordance with the recognized first music information from a storage device when the recognizing step (c) recognizes the first music information; and (e) outputting the read movement pattern data or information directing the movement pattern data to a movement performing device of the robot.

According to further aspect of the present invention, there is provided a program, which a computer executes to realize a movement pattern control process for a robot, comprising the steps of: (a) inputting a result of the analysis of, as an audible sound signal, a music information file comprising first music information for specifying a movement pattern data or information directing the movement pattern data and a second music information for reproducing music; (b) recognizing the first music information in accordance with the result of the analysis; (c) reading movement pattern data or information directing the movement pattern data in accordance with the recognized first music information from a storage device when the recognizing step (b) recognizes the first music information; and (d) outputting the read movement pattern data or information directing the movement pattern data to a movement performing device of the robot.

According to yet further aspect of the present invention, there is provided a music information file, comprising: first music information that a robot can recognize by analyzing as an audible sound signal and that specifies a movement pattern data for making the robot perform a movement pattern; and second music information for reproducing music.

According to yet further aspect of the present invention, there is provided a server apparatus, comprising: an accessing device that accesses a database storing a music information file comprising first music information that a robot can recognize by analyzing as an audible sound signal and that specifies a movement pattern data for making the robot perform a movement pattern and second music information for reproducing music; a reading device that reads the music information file from the database via the accessing device in accordance with a request from a user; and a transmitting device that transmits the read music information file via a communication network to the user or a communication terminal apparatus designated by the user.

According to yet further aspect of the present invention, there is provided a communication terminal apparatus, comprising: a requesting device that requests, to a server apparatus via a communication network, a music information file comprising first music information that a robot can recognize by analyzing as an audible sound signal and that specifies a movement pattern data for making the robot perform a movement pattern and second music information for reproducing music; a receiving device that receives the requested music information file from the server apparatus via the communication network; and a storage device that stores the received music information file.

According to yet further aspect of the present invention, there is provided a music information reproducing apparatus, comprising: a storage device that stores a music information file comprising first music information that a robot can recognize by analyzing as an audible sound signal and that specifies a movement pattern data for making the robot perform a movement pattern and second music information for reproducing music; and a reproducing device that audibly reproduces the first and the second music information included in the music information file stored in the storage device.

According to the present invention, a robot that moves along music by general music information and a movement pattern control program of robot can be provided in cheap price without a special technique such as a data hiding technique. Also, according to the present invention, music information file for making the robot perform the movement pattern can maintain compatibility with a conventional music information file and can be provided in a cheap price.

BRIEF DESCRIPTION OF THE DRAWINGS

FIG. 4 is a diagram showing a music information file and an example of a data structure according to the embodiment of the present invention.

DETAILED DESCRIPTION OF THE PREFERRED EMBODIMENTS

Figure 1:
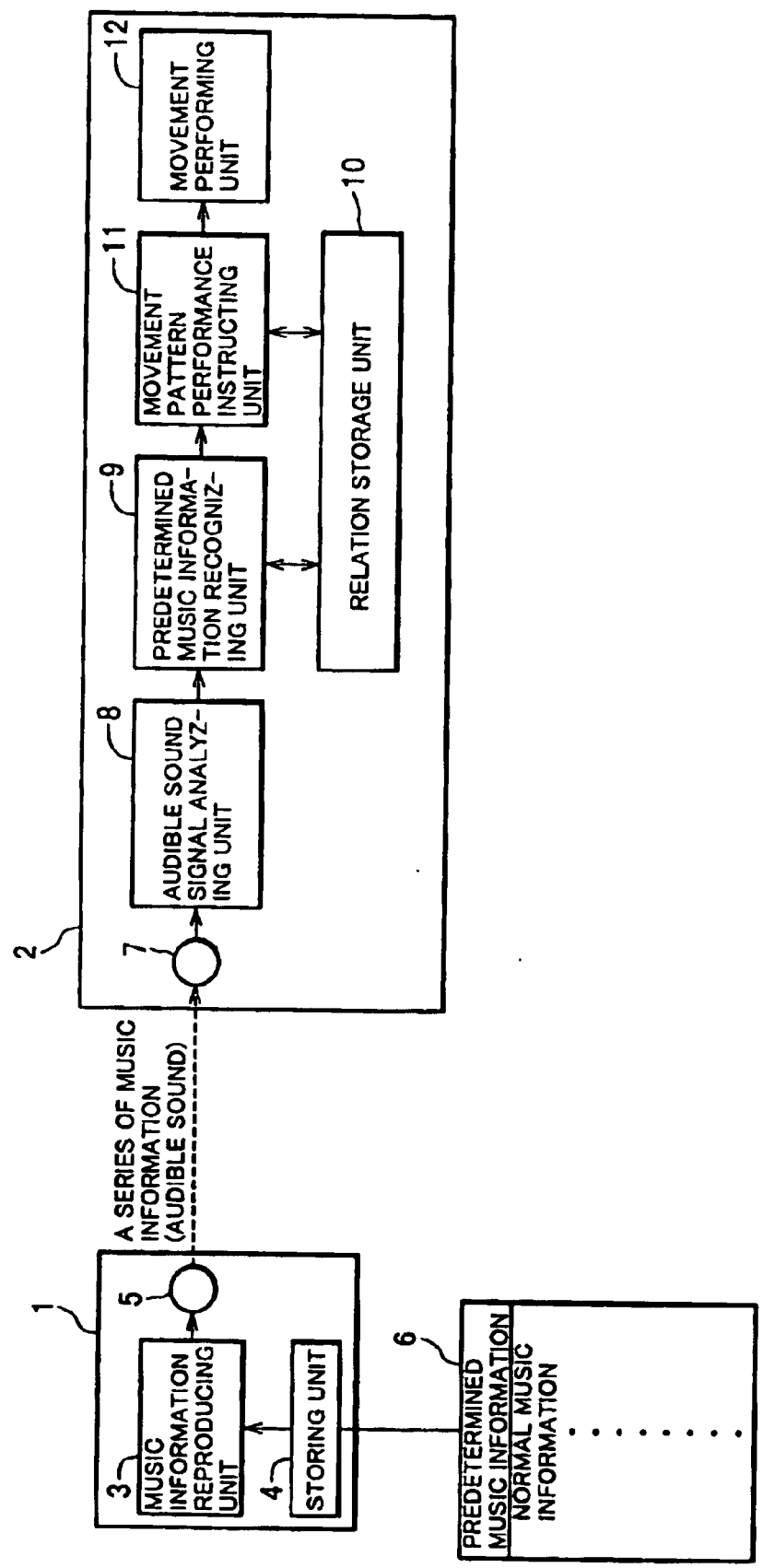
FIG. 1 is a block diagram showing a robot and a music information reproducing apparatus for making the robot listen to music according to an embodiment of the present invention.

FIG. 1 is a block diagram showing structures of a robot and a music information reproducing apparatus according to an embodiment of the present invention for making a robot input music as an audible sound signal. In the music information reproducing apparatus 1, a music information reproducing unit 3 reads a music information file 6 stored in a storing unit 4. Then, it reproduces normal music information for reproducing music and the audible sound is sounded from a loud speaker 5. The music information file 6 is made of normal music information for reproducing music added with predetermined music information for specifying a movement pattern data that makes the robot 2 perform a movement pattern specified by the predetermined music information. The predetermined music information is analyzed as an audible sound signal and recognized by the robot 2 in accordance with a result of the analysis.

The robot 2 is a human form or an animal form robot, and the movement pattern is a dance movement designed to match the music information. Each part of the robot 2 is driven in accordance with the specified movement pattern. This movement pattern is set up corresponding to one tune of normal music information. Although a same movement pattern may be repeated, generally the repeat is not necessary. The plural kinds of the predetermined music information, each kind of which specifies a corresponding movement pattern, etc., are prepared, and at least one kind of the predetermined music information corresponding to the movement pattern adequate for the normal music information reproduced thereafter is added to the normal music information. Further, the predetermined music information can be shared by different kinds of normal music information, that is, one movement pattern may be assigned to a plurality of the normal music information.

Although, the above-described predetermined music information is normally added one in a header part of a region to store the music information, it may be added also in a certain part of the normal music information or only in a certain part of the music information instead of adding in the header part. When the predetermined music information is added in the header part, after the recognition of the predetermined music information is finished, the predetermined music information has a starting function to start the robot 2 to perform the movement pattern at the starting time of the later-described normal music information.

When the predetermined music information is added in a certain part of the music information, the robot can start dancing with a specified movement pattern from that time, and the specified movement pattern at the beginning of the music can be changed to a different pattern to add a variation for the dance. Also, if it is decided that a predetermined music information is not added in a certain part of the music information, the audible sound signal may not analyzed to prevent an incorrect action (error) by music that happens to be reproduced in background during the reproduction the music information. The predetermined music information and the normal music information are stored as completely the similar music information, and they are distinguished by their contents of the music, reproducing time positions, rest durations, etc.

A music information file 6 is, for example, a song data stored with digital cord. This music information file may be a ringer melody file, a song data file for karaoke, etc. Also, the music information file 6 is stored by, for example, the standard MIDI File (SMF) format and an original song data file format of a sequencer. In the case of the song data file, a music information reproducing unit 3 has a tone generator and a D/A converter. The tone generator generates a musical tone wave in accordance with a NoteOn event in the song data, and the musical tone wave is converted to an analogue signal by the D/A converter to reproduce the musical tone wave as an audible sound signal.

Further, the format of the song data is not limited only to those used by the embodiment. For example, the format of the song data may be any type such as "event+relative time" which uses a lapsed time from the event one event before the present event as the occurrence time of a performance event, "event+absolute time" which uses an absolute time in a program or measure as the occurrence time of a performance event, "pitch (rest)+absolute time" which uses a tone pitch and length or a rest and length for representing performance data, and "direct format" which provides a memory area of each set of the song data in the minimum performance resolution unit and stores the song data in the memory area corresponding to the occurrence time of the performance event.

The memory of the series of musical notes may not be continuous in the time sequence as far as they can be managed to be a continuous sequence data after they are read out.

When the song data has a plurality of channels corresponding to a plurality of musical tone generator units, the above-described predetermined musical information is stored only in one channel.

Although the robot 2 has a microphone 7, an audible sound signal analyzing unit 8, a predetermined music information recognizing unit 9, a relation storage unit 10 for storing a relationship between the predetermined music information and the movement control data, a movement pattern performance instructing unit 11 and a movement performing unit 12, only function blocks relating to the embodiment of the present invention is shown.

The relation storage unit 10 for storing a relationship between the predetermined music information and the movement control data stores relationships between plural kinds of the predetermined music information set beforehand and plural kinds of the movement control data, each of which is specified by each kind of the predetermined music information.

Further, the movement control data such as this movement pattern data or the like may be added or renewed. By doing that, a new movement pattern may be performed by the robot 2 in accordance with a supply of a ringer melody (music information) of a new song.

The microphone 7 inputs a consecutive music information output from the speaker 5 as an audible sound signal to output to an audible sound signal analyzing unit 8. The audible sound signal analyzing unit 8 analyzes a physical amount of sound included in the consecutive music information input as the audible sound signal, for example, a pitch, a pitch continuing duration, rest period of the adjoining sounds, etc.

Further, a data of a series of the notes may be output by analyzing notes based on the physical amount. That is, a pitch and duration of each note are recognized by a physical amount of, for example, a frequency and a length of each sound obtained by analyzing the consecutive musical information, and a sequence of a series of the recognized notes will be output.

A predetermined music information recognizing unit 9 recognizes the predetermined music information from the consecutive music information based on the analyzed result output from the audible sound signal analyzing unit 8. Further, when the analyzed result of the physical amount is input from the audible sound signal analyzing unit 8, the predetermined music information is recognized as a series of notes after analyzing the notes.

The recognition of the predetermined music information is performed as follows. Plural kinds of the predetermined music information are provided beforehand as the predetermined music information, and they are compared one by one with the series of the notes analyzed by the audible sound signal analyzing unit 8 (i.e., the input predetermined music information). Then if there is the kind of the predetermined music information matched to the input predetermined music information, the predetermined music information is recognized, and information that specifies the recognized predetermined music information is output to the movement pattern performance instructing unit 11. A movement pattern performance instructing unit 11 reads out the movement control data specified by this information (that is, the recognized predetermined music information) to out put to the movement performing unit 12.

In the drawing, a structure of more concrete example is shown. Since the plural kinds of the predetermined music information are stored in the relation storage unit 10 for storing a relationship between the predetermined music information and the movement control data, the predetermined music information is recognized to output a storing position of the movement control data stored with being corresponding to the recognized predetermined music information to the movement pattern performance instructing unit 11 by comparing the plural kinds of the predetermined music information with the input music information one by one. The movement pattern performance instructing unit 11 reads a movement control data specified by the recognized predetermined music information to output to the movement performing unit 12.

The movement performing unit 12 has, for example, plurality of driving means, each of which drives each part of the robot (right hand, right leg, left hand, left leg, neck, etc.), and operates individually or cooperating with the others.

The movement control data has at least a movement pattern data and, in addition to the movement pattern data, performance tempo, performing time, etc.

The movement pattern is a pattern data for the robot to perform the designated dance movement. For example, the movement pattern is a sequence data having a time sequentially configured multiplicity of data to specify each part of the robot and data to specify an angle of the movement of the part are one-unit movement data, and performance timing data added to each set of data to specify a part and an angle.

The performance tempo is a tempo to perform consecutive one-unit movements at the time when the robot performs the movement pattern, and it is set up in advance to be synchronized with the reproduction tempo of the normal music information that is reproducing at the meantime. In other words, it is set up to look like that the robot moves along with the reproduction of the normal music information.

On the other hand, the reproduction tempo is a value (speed) defined by the number of the quarter notes played in a minutes. However, if it is a value to define the speed of the reproduced music, it is not necessary to follow the definition. The performance tempo is also a value that follows the arbitrary definition, for example, it may be a value derived from a arbitrary definition such as a time between one-unit movements, the number of the one-unit movements in a minute, or the like.

However, when the reproduction tempo and the performance tempo are defined by the corresponding definitions, that is, a case of making one beat of the music correspond to a one-unit movement, it is not necessary for the reproduction tempo and the performance tempo to be the same value, but one of them can be an integer multiplication of another.

The performance time is duration from the beginning to the end of the performance of the movement pattern and is set up in advance to correspond with the reproducing time of the reproducing normal music information. In other words, it is set up to start the movement of the robot as soon as reproduction of the normal music information is started and to stop the movement when reproduction of the normal music information ends.

A process executed by the robot 2 is briefly explained here although A detailed process of the robot 2 when the music information file is a ringer melody for a cellular phone will be explained later with reference to FIG. 6.

The music information reproducing device 1 reproduces music information form the loud speaker 5 as an audible sound. The robot 2 placed near the music information reproducing device 1 inputs the music information as an audible sound signal via its microphone 7, and then the audible sound signal analyzing unit 8 analyzes the audible sound signal.

At first, a predetermined series of the notes in a header part is input as an audible sound signal and therefore the predetermined music information recognizing unit 9 recognizes it as the predetermined series of the notes in accordance with the result of the analysis.

The movement pattern performance instructing unit 11 reads a movement patter p, performance tempo t and performance time s that are specified by the recognized predetermined music information in order to output the movement patter p at the performance tempo t in the performance time s to the movement performing unit 12.

All of the function blocks in the robot 2 shown in FIG. 1 may be executed by the system program stored in the robot 2.

However; instead of that, a movement pattern control program of the robot may be executed at the same time to execute both programs coordinately. In this case, any methods of distributing tasks of both programs may be used.

In the below, some actual examples about distributing tasks are shown.

The first distributing task is that the movement pattern control program of the robot 2 executes from the audible sound signal analyzing unit 8 to the movement pattern performance instructing unit 11.

The second distributing task is that the movement pattern control program of the robot 2 executes from the predetermined music information recognizing unit 9 to the movement pattern performance instructing unit 11.

However, in the second distributing task, as explained already, there are the case that the audible sound signal analyzing unit 8 analyzes and outputs the physical amount of the audible sound signal and the case that the audible sound signal analyzing unit 8 analyzes and output the series of the notes.

Also, in either distributing task, there are the first case that the movement pattern performance instructing unit 11 outputs the movement pattern data itself to the movement performing unit 12 and the second case that the movement pattern performance instructing unit 11 outputs information instructing the movement pattern data.

In the second case, information instructing the movement pattern data is stored in the relation storage unit 10 for storing a relationship between the predetermined music information and the movement control data, and, in addition to that, a movement pattern data storing unit which is read by information instructing the movement pattern data is set up. The system program inputs the information instructing the movement pattern data and reads the movement pattern data from the movement pattern data storing unit.

For the performing tempo and the performing time, there is a case that the movement pattern performance instructing unit 11 outputs the movement pattern with a consideration of the performing tempo and the performing time to the movement performing unit 12. Also, there is a case that the movement pattern performance instructing unit 11 outputs the performing tempo itself and the performing time itself, or information to instruct the performing tempo and the performing time to be reflected in the movement performing unit 12 side.

By combining the above described various choices, various distribution processes may be performed.

For example, the movement pattern performance instructing unit 11 reads out the movement pattern with a consideration of the performing tempo and the performing time. Part-specifying data and angle-specifying data of the read-out result are provided to the movement performing unit 12.

Also, for example, the movement pattern performance instructing unit 11 outputs information instructing the movement pattern data, the performing tempo and the performing time, and the movement performing unit 12 reads out the movement pattern instructed by information instructing the movement pattern data with a consideration of the performing tempo and the performing time to output part-specifying data and angle-specifying data.

In the above explanation, the case that the music information file 6 is a song data file is explained. However, the speaker 5 outputs the audible sound, and the microphone 7 of the robot 2 inputs that audible sound signal.

Therefore, the music information file may be a wave data (a file with a file extension "wav") or a compressed wave data such as MPEG-1 Audio Layer-III (MP3). The wave data can be D/A converted by the music information reproducing unit 3, and the speaker 5 can reproduce an audible sound as consecutive music information in accordance with the wave data.

However, in the case of the compressed wave data, it is necessary to prepare a decoder in the music information reproducing unit 3.

The music information file 6 may also be an analogue wave data. In this case, the music information reproducing device 1 is, for example, a magnetic tape player.

In any case described in the above, at least one of the storage point and the music contents is different between the predetermined music information and the normal music information, both informations are stored, read out and reproduced in the same way to output as the audible sound, and a user listens to both informations as the same music information of the audible sound.

Also, in any case described in the above, a removal recording medium can be used for the storage unit 4.

In the case of the song data file, a semiconductor memory card such as a flexible magnetic disk, a CD-ROM and a flash-memory can be used. In the case of the digital wave data file, an audio CD and the semiconductor memory card can be used. Also, in the case of the analogue wave data, the magnetic tape can be used.

Further, as described later with reference to FIG. 2, when the music information reproducing device 1 has a communicating function such as a cellular phone terminal and a personal computer, the music information can be downloaded from the server device to the storing unit 4 via the communication network.

Also, the predetermined music information and the normal music information may be received in this order from the sever device by a streaming reproduction method to generate a sound signal instantly at the music information reproducing device 1 and reproduce as an audible sound signal.

Also, the music information reproducing device 1 may be a broadcast receiving device without the storing unit 4, such as a radio, a television, etc. In this case, the music information file 6 is sent from a broadcasting station.

Figure 2:
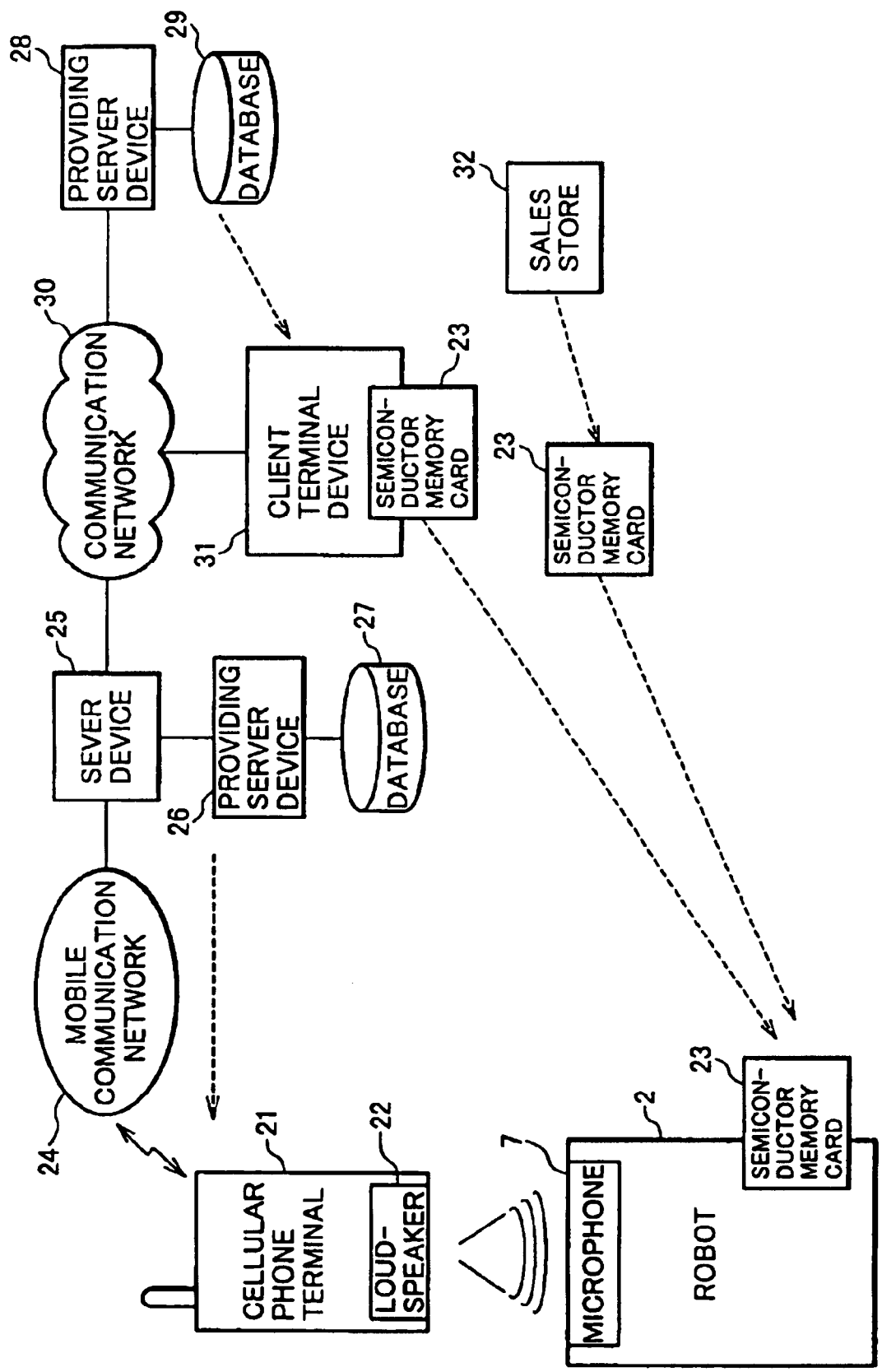
FIG. 2 is a system block diagram showing a movement pattern control program of a robot and an example of network service to provide music information file to a user according to the embodiment of the present invention.

FIG. 2 is a system block diagram showing a movement pattern control program of a robot and an example of network service to provide music information file to a user according to the embodiment of the present invention.

A cellular phone terminal 21 is an example of the music information reproducing unit shown in FIG. 1 and has a loud speaker for a ringer melody.

The ringer melody file is an example of the music information file 6 shown in FIG. 1. The cellular phone terminal 21 can use this ringer melody file, and any file form of the song data that has a data structure like the music information file 6 shown in FIG. 1 may be the ringer melody file. If the cellular phone terminal 21 can handle a wave data (an audio data) as a ringer melody, the ringer melody file may be the wave data.

However, in a case of transmitting via a communication network, a wave data with a large amount of the data makes a transmission time longer and a communication cost (communication charge and packet transfer charge) higher. Also, when the ringer melody is stored in the cellular phone terminal 21, a storing device with large capacity is needed. Therefore, a MIDI data or a song data format based on the simplified MIDI data that is similar to the MIDI data are ideal for the ringer melody file.

Further, in this case, since the predetermined music information (the predetermined series of the notes) is stored with the same format as that of the normal music information (a song data of the specified song), it is compatible with the conventional ringer melody file and can be used as a ringer melody file of the normal cellular phone terminal.

The robot 2 is the same as the robot 2 shown in FIG. 1 and has the microphone 7. Also, a removal semiconductor memory card 23 is usable.

The movement pattern control program and the movement control data including the movement pattern or the like are stored in the removable semiconductor memory card 23.

The removable semiconductor memory card 23 stores the movement control program for the robot and the movement control data including the movement pattern, etc.

The sever device 25 of a mobile communication carrier (a telecommunications company) provides a contents providing service of the providing server device 26 which is connected via a private network to the cellular phone terminal 21 which is a member of the mobile communication network 24.

When the cellular phone terminal 21 requests a provision of a desired ringer melody to the providing server device 26, a receipting unit of the providing server device 26 receipts the request from the user. Then the data access unit reads out the ringer melody file from the database 27 corresponding to the request, and a transmitting unit provides (charged or free of charge) the ringer melody file to the cellular phone terminal 21 via the mobile communication network 24.

On the other hand, in the cellular phone terminal 21, a ringer melody file requesting unit requests the user-desired ringer melody file to the providing server device 26 via the mobile communication network 24, and the receiving unit receives the ringer melody file from the providing server device 26 via the mobile communication network 24 and stores it in the predetermined storing unit.

Although the ringer melody is a music information file consisted of the normal music information for reproducing music and the predetermined music information added to the normal music information for specifying a movement pattern data, there is no difference between the normal music information and the predetermined music information as a music information file and therefore a conventional ringer melody providing service can be used for providing the music information file according to the embodiment.

On the other hand, the memory card 23 storing the movement pattern control program and the movement control data of the robot is provided as follows.

A providing server device 28 accesses a database 29 storing the above-described program and data. A communication network 30 is a public communication network such as, for example, the Internet or the like. A client terminal device 31 can write data into the semiconductor memory card 23, and a sales store 32 sells the semiconductor memory card 23.

The user purchases the semiconductor memory card 23 storing the above-described contents from the sales store 32. The semiconductor memory card 23 is inserted to a semiconductor memory card slot of the robot 2 to provide the program and data to the robot.

Moreover, the movement pattern control program for the robot and the contents of the movement pattern control data are downloaded (charged or free of charge) from the providing server device 23 on the communication network 30 to a personal computer as the client terminal device 31 and are stored in to the general purpose semiconductor memory card 23.

When the client terminal device 31 requests contents provision of the movement pattern control program and the movement control data of the desired robot to the providing server device 28, a receipting unit of the providing server device 26 receipts the request from the user. Then the database access unit that is not shown in the drawing reads out the desired contents from the database 29 corresponding to the request, and a transmitting unit provides (transmits) the contents to the client terminal device 31 via the communication network 30.

On the other hand, in the client terminal device 31, a contents requesting unit requests contents of the user-desired movement pattern control program and the movement control data of the robot to the providing server device 28 via the communication network 30, and the receiving unit receives the contents from the providing server device 28 via the communication network 30 and finally stores it in the semiconductor memory card 23.

By inserting the semiconductor memory card 23 to the robot 2, the movement pattern control program and the movement control data of the robot are provided to the robot 2.

Although, in the above-described embodiment, the movement control data such as the movement pattern data or the like and the robot movement pattern control data output program are stored in the semiconductor memory card 23 to provide the above-described data and program to the robot 2 by inserting the semiconductor memory card 23 to the robot 2, this invention is not limited to the embodiment.

The robot 2 can connect to the providing server device 28 via the communication network (the Internet or the like) directly, and the data, and the program may be downloaded from the providing server device 28. Moreover, the robot 2 may be connected to the cellular phone terminal 21 or the client terminal device 31 with a wireless or wired communication network to download the data and the program from the providing server device 28 via these terminal devices.

In the above-described explanation, the ringer melody is transmitted from the providing server device 26 to the cellular phone terminal 21 via the connection via a private network.

Instead of that, the ringer melody may be provided from the providing sever 28 or another similar providing server device 28 to the cellular phone terminal 21.

The above-described terminal for requesting a transmission of contents such as data or program and a terminal receiving the requested contents are not necessarily the same terminals. The user may designate the target terminal that receives the requested contents at the time of the contents request.

Figure 3:
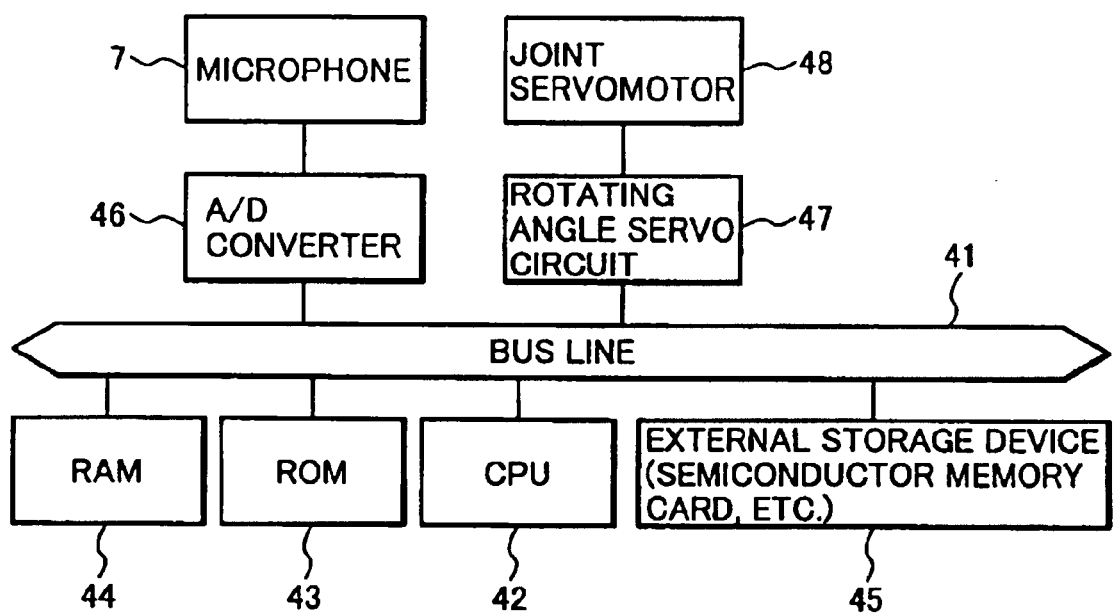
FIG. 3 is a block diagram showing a hardware structure of the robot according to the embodiment of the present invention.

FIG. 3 is a block diagram showing a hardware structure of the robot according to the embodiment of the present invention.

A plurality of blocks including a CPU 42 are connected to a bus line 41, and data and address are forwarded each other.

The CPU 42 executes the system program stored in the ROM 43 and the movement pattern control program of the robot stored in the above-described semiconductor memory card 23 as an external storage device 45 with using the RAM 44 as a working area.

Also, a data for executing the above-described program is stored in a ROM 43, and the movement control data is stored in an external storing device (for example, the semiconductor memory card 23) 45.

The consecutive music information input from the microphone 7 is converted to the digital signal at the A/D converter 46 to store in a working area of the RAM 44 via the bus line 41. And the CPU 42 executes the functions of the audible signal analyzing unit 8, the predetermined music information recognizing unit 9 and the movement pattern performance instructing unit 11 and reads out the movement control data stored in the external storing device 45 to output to a rotating angle servo circuit 47. Moreover, a pitch detection in the audible sound signal analyzing unit 8 may be executed with hardware by using Digital Signal Processor (DSP) or the like.

The rotating angle servo circuit 47 servo-controls a rotating angle of a joint servomotor 48 at each part in accordance with the movement control data.

FIGS. 4a to 4b are diagrams showing an example of the data structure of the music information file and the semiconductor memory card 23.

FIG. 4a is a diagram showing the data structure of the ringer melody, FIG. 4b is a diagram showing the data structure of the semiconductor memory card 23 and FIG. 4c is a diagram showing the predetermined series of the notes and a table 52 corresponding to the predetermined series of noted and the movement control data which showed in FIG. 4b.

FIG. 4a schematically shows a ringer melody data area of the ringer melody file.

As a ringer melody file, a header part may be added before the ringer melody region.

The ringer melody region stores a consecutive series of the notes for a ringer melody in a order of a time sequence of the performance of the ringer melody and the predetermined series of the notes for specifying a movement control data at a head of the region.

Thereafter, a predetermined blank (corresponding to a musical rest for a few second) is inserted before a series of the notes for normal ringer melody.

The blank is inserted for an easy recognition of the boundary of the predetermined series of the notes and the normal series of the notes.

However, if there is no blank, as far as the robot can recognize (distinct) the predetermined series of the notes and the normal series of the notes, the blank is not mandatory.

After making the robot listen to an audible sound of the predetermined series of the notes for a few seconds to determine the movement pattern and a time corresponding to the blank, the robot can start the performance of the movement pattern at a performance tempo.

At a meantime, reproduction of the normal ringer melody is started at the predetermined reproduction tempo.

On the other hand, as shown in FIG. 4b, the semiconductor memory card 23 contains a movement pattern control program 51 of the robot, a predetermined series of the notes/a table corresponding to the movement control data 52 and a plurality of the movement pattern data $53_1$ to $53_p$.

As shown in FIG. 4c, the predetermined series of the notes/the table corresponding to the movement control data 52 is a data showing a relationship between plural kinds of the predetermined series of the notes m ($1 \leq m \leq M$), a movement pattern p ($1 \leq p \leq P$), a performing tempo t and a performing time s.

In order to synchronize the movement pattern of the robot with the ringer melody, the performance tempo t is set to a value to be synchronized with the reproduction tempo for the normal ringer melody (principally the reproduction tempo can be set independently from the performance tempo because the reproduction tempo is set in the series of note for a ringer melody), and the performance time s is set to be matched with the reproduction time of the series of the notes for the normal ringer melody.

Since the number of the ringer melodies is countless, the reproducing tempo and the reproducing time vary. In order to synchronize the performing tempo t and the performing time s to them, a large number M of the kinds of the predetermined series of the notes are also needed. Although, the ringer melody is different, as the movement pattern p, the same movement pattern may be used.

Therefore, the total number P of the kinds of the movement pattern can be under the total number M of the kinds of predetermined series of the notes (P=<M) by sharing them along the different ringer melodies.

In this case, however, each movement pattern data may be stored in the corresponding table shown in FIG. 4c directly, when a same movement pattern data is stored redundantly to a different predetermined series of the notes, a data capacity of the corresponding table will be wasted.

Therefore, in the predetermined series of the notes/the movement control data relationship table 52 shown in FIG. 4c, instructing information for referring a substance of the movement pattern data is stored for the movement pattern p, and the movement pattern data is obtained by referring the movement pattern data $53_1$ to $53_p$ shown in FIG. 4b in accordance with the instructing information.

The movement pattern data $53_1$ to $53_p$ may be prepared as preset data in the ROM 43 shown in FIG. 3.

Moreover, the movement pattern control program 51 of the robot may instruct processes until outputting the information instructing the movement pattern data with reference to the predetermined series of the notes/the movement control data relationship table 52 shown in FIG. 4c, and the system program in the robot may read out the movement pattern data from the movement pattern data $53_1$ to $53_p$.

A specific explanation referring FIG. 4c is as follows.

When the predetermined music information recognizing unit 9 recognizes "a series of the notes 1", "1" for the movement pattern p, "100" for the performing tempo t and "40 seconds" for the performing time are specified. As same as the above, when "a series of the notes 2" is recognized, "2" for the movement pattern, "80" for the performing tempo t and "25 seconds" for the performing time are specified.

Also, when "a series of the notes 3" is recognized, "1" for the movement pattern p is specified as same as that in the case of the "a series of the notes 1", but "120" for the performing tempo t and "30 seconds" for the performing time are specified. That is, however, the movement pattern is the same, the robot 2 dances with faster tempo and shorter time than the case of the "a series of the notes 1".

By the predetermined series of the notes, only the movement pattern p or only the movement pattern p and the performing tempo t may be specified.

Since the reproducing tempo of the predetermined series of the notes itself has no relation with the above-described reproducing tempo and executing tempo, it can be set arbitrarily. It may be corresponded to the reproducing tempo of the normal ringer melody.

It is preferable that the predetermined series of the notes is not included in the prepared series of the notes for the normal ringer melody in any ringer melody files.

When the same series of the notes as the predetermined series of the notes is included in the normal series of the notes for the ringer melody, the predetermined music information recognizing unit 9 of the robot 2 recognizes the same series of the notes as the predetermined series of the notes. Therefore, that is not preferable because there is a risk of an error depending on the specification of the movement pattern control program of the robot.

Also, the predetermined series of the notes is sounded from the cellular phone to be listened by the user, the predetermined series of the notes should be a musically preferable series of the notes having a musical notion without unpleasant feeling, for example, a fanfare, etc.

In the case that the predetermined series of the notes is added in a body of the ringer melody, the performance time s shown in FIG. 4c may be deleted or ignored by the program.

Moreover, when the movement pattern or the like are added or renewed, and when a ringer melody of a new song is provided, the predetermined series of the notes/the movement control data relationship table 52 also need to be renewed.

Figure 5:
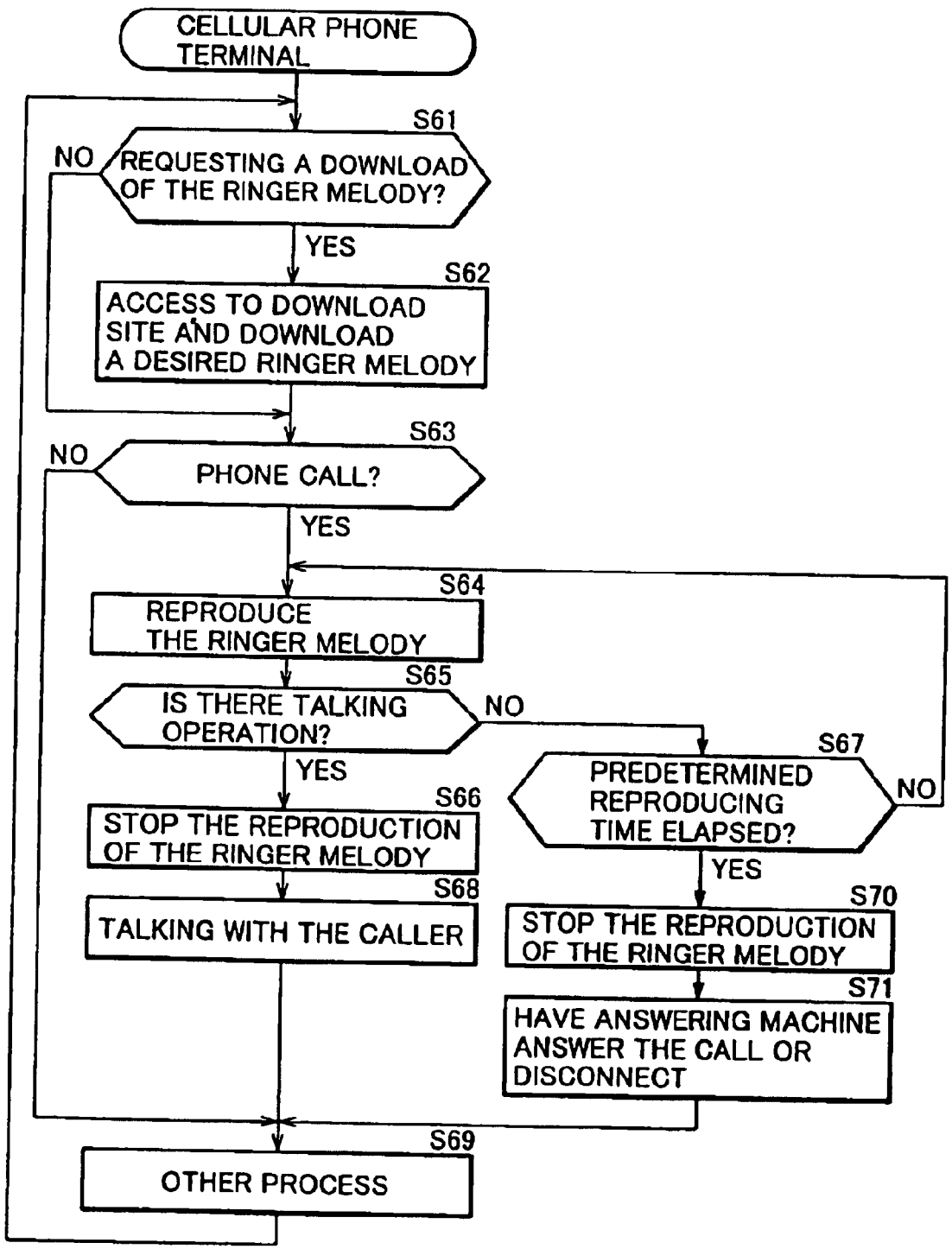
FIG. 5 is a flow chart explaining a cellular phone terminal process, which is an example of the music information reproducing device, including a download movement of a ringer melody according to the embodiment of the present invention.
Figure 6:
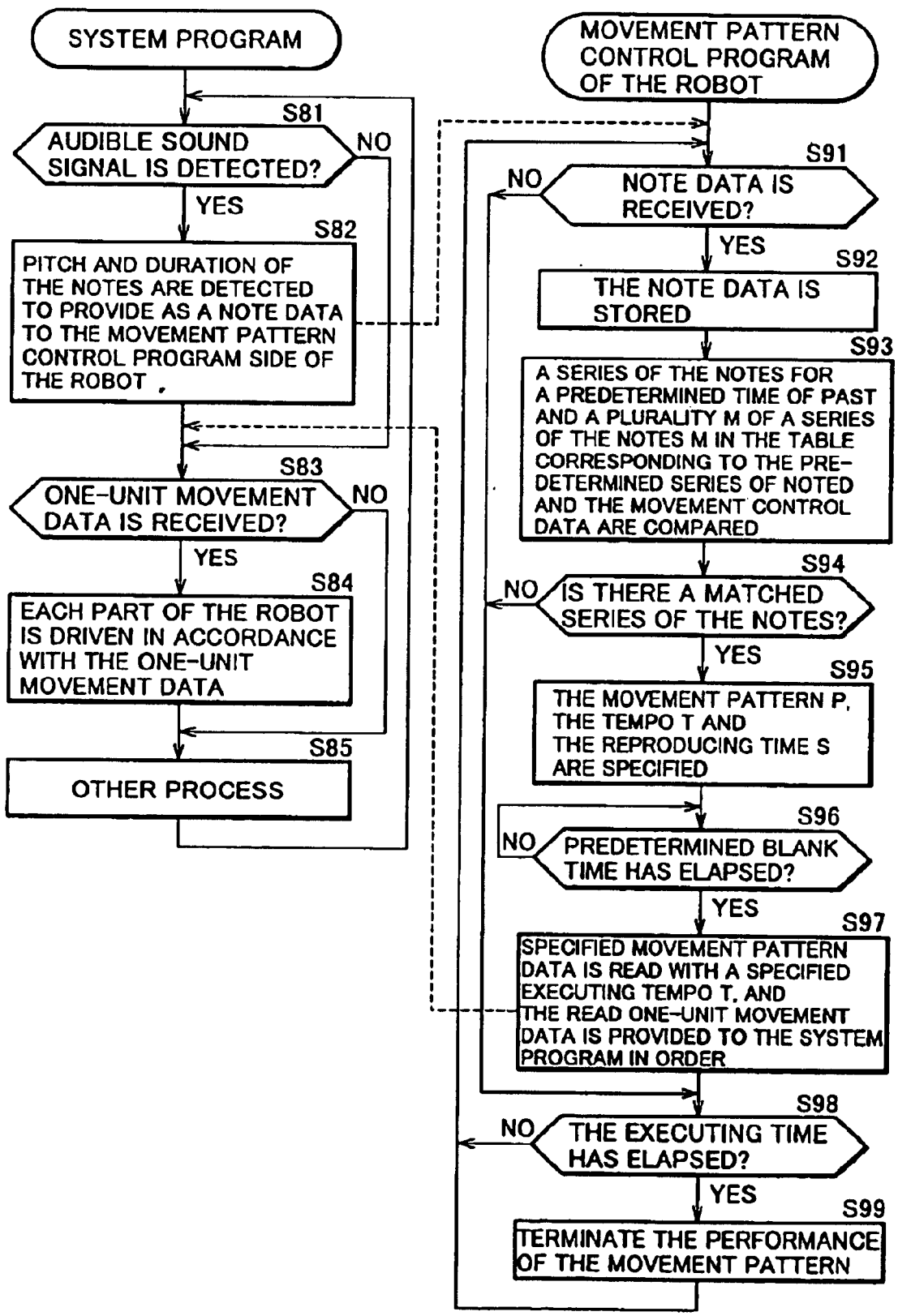
FIG. 6 is a flow chart explaining a process to execute a particular movement pattern recognizing the ringer melody according to the embodiment of the present invention.

Next, an example of that the robot according to the present invention recognizes the ringer melody of the cellular phone terminal to execute a specific movement pattern by referring to FIG. 5 and FIG. 6.

FIG. 5 is a flow chart explaining a cellular phone terminal process, which is an example of the music information reproducing device, including a download operation of a ringer melody according to the embodiment of the present invention. An explanation of a ringing operation from the cellular phone is omitted.

At Step S61, the process judges whether there is a user-request for requesting a download of the ringer melody or not. When there is the request, the process proceeds to Step S62, and when there is not, the process proceeds to Step S63. At Step S62, the process accesses to a download site of the ringer melody, and the process proceeds to Step S63.

At Step S63, the process judges whether there is a phone call from a base station of the mobile communication network or not. When there is the phone call, the process proceeds to Step S64, and when there is not, the process proceeds to Step S69.

At Step S64, the ringer melody is started to reproduce, and at Step S65, the process judges there is a talking operation or not. When there is the talking operation, the process proceeds to Step S66, and when there is not, the process proceeds to Step S67.

At Step S66, the reproduction of the ringer melody is stopped, and at Step S68, talking with the caller is started and the process proceeds to Step S69.

On the other hand, at Step S67, the process judges whether the predetermined reproducing time elapsed or not. When the time has elapsed, the process proceeds to Step S70, and when the time has not elapsed yet, the process returns to Step S64 to continue to reproduce the ringer melody.

At Step S70, the reproduction of the ringer melody is stopped, and the process proceeds to Step S71 to have the cellular phone answer by the answering machine, or the process proceeds to Step S69 to wait for the base station to disconnect the phone call and have the cellular phone be the call waiting state.

At Step S69, other process, for example, a reproducing process of the ringer melody data without a phone call, that is, the reproduction just for listening to it such as an alarm, is executed, and the process returns to Step S61.

FIG. 6 is a flow chart explaining a process to perform a particular movement pattern by recognizing the ringer melody according to the embodiment of the present invention.

The system program and the movement pattern control program of the robot stored in the semiconductor memory card 23 are executed at the same time.

At Step S81, in the system program side, it is judged whether the audible sound signal is detected (pitch detecting) nor not. When the audible sound signal is detected, the process proceeds to Step S82, and when it is not, the process proceeds to Step S63. At Step S82, a pitch and duration of the notes are detected to provide as a note date to the movement pattern control program side of the robot, and the process proceeds to Step S83.

At Step S91 on the movement pattern control program side, whether the note data is received or not is judged. When the data is received, the process proceeds to Step S92, and when the data is not received, the process proceeds to Step S98.

At Step S92, the note data is stored, and at Step S93, a series of the notes for a predetermined time of past (a predetermined time of the series of the notes) and a plurality M of a series of the notes m in the table 52 corresponding to the predetermined series of noted and the movement control data are compared one by one and the process proceeds to Step S94. Further, as the comparing process, it is not limited to the above-described process wherein each series of the notes are compared one by one, any process that can judge the agreement of the series of the notes can be used.

At Step S94, whether there is a matched series of the notes or not is judged. When there is the matched series of the notes, the process proceeds to Step S95, and when there is not, the process proceeds to Step S98. At Step S95, the movement pattern p, the tempo t and the reproducing time s are specified to proceed to Step S96. Further, the reproducing time is set to be s=0 in an initial state.

At Step S96, whether a predetermined blank time has elapsed or not is judged. When the time has elapsed, the process proceeds to Step S97, and when it has not elapsed yet, the process returns to Step S96.

At Step S97, a specified movement pattern data is read with a specified executing tempo t, and the read one-unit movement data is provided to the system program in order. The movement pattern data is a sequence data of the plurality of one-unit movement data.

At Step S83 on the system program side, whether a one-unit movement data is received or not is judged. When it is received, the process proceeds to Step S84, and when it is not received, the process proceeds to Step S85.

At Step S84, each part of the robot is driven in accordance with he one-unit movement data, and the process proceeds to Step S85. At Step S85, other process is executed, and the process returns Step S81.

At Step S98 in the movement control program side of the robot, whether the executing time has elapsed or not is judged. When the time has elapsed, the process proceeds to Step S99, and when it has not elapsed yet, the process returns to Step S91.

At that time, when the reproducing time s=0 (an initial value), the process returns to Step S91 as same as the case the executing time has not elapsed.

At Step S99, reading out of the movement pattern data is ended. At that time, the reproducing time s is reset to the initial value s=0.

Further, in the flow chart shown in FIG. 6, the executing time is decided by the series of the notes added to the header part in the ringer melody area. Therefore, even if during the calling, the robot continues to move until the executing time has elapsed.

Therefore, a switch function to stop execution of the movement pattern may be set in the body of the robot 2 to stop the performance of the movement in accordance with the operation of the switch by the user.

In the above-described explanation, by the ringer melody at the time of receiving a call on the cellular phone terminal, the robot 2 performs the predetermined movement pattern and informs the receiving of the call to the user.

However, this is just a usage example. Although if there is no call, there is another usage example that the user makes the robot 2 move by making the robot 2 listen to the ringer melody stored in the memory (refer to other process at Step S69).

Although the above-described embodiment is explained on condition that the robot is physical and mechanical existence, the robot may be a virtual existence displayed on a display.

Also, in this case, the music information is transmitted to the device side having the display as an audible sound, and the user can also enjoy viewing the movement pattern (dance) of the robot on the display of the device near the music information reproducing device listening to the music information as the audible sound.

There are a karaoke playing device with a display, a game device, and a large display device used for advertisement or the like set in the street for ideal devices.

Although the above-described embodiment is explained on condition that the music file is transmitted from the music information reproducing device to the robot as the audible sound. Instead of that, the music information reproducing device and the robot may be connected with cable to output the audible sound signal to the robot by the electrical signal. Since a cable connection is needed, it is less convenient. However, a special connecting interface for inputting and outputting a cord data such as MIDI data is not needed, and therefore a robot that can perform the movement pattern (dance) along with music can be realized at a cheap price. At that time, the music information reproducing device may reproduce and output the music information file as an audible sound.

The present invention has been described in connection with the preferred embodiments. The invention is not limited only to the above embodiments. It is apparent that various modifications, improvements, combinations, and the like can be made by those skilled in the art.

What are claimed are:

1. A robot, comprising:
    a storage device that stores a movement pattern data to be specified by first music information;
    an input device that inputs, as an audible sound signal, a music information file comprising second music information for reproducing music and the first music information;
    a recognizing device that recognizes the first music information based on the input audible sound signal; and
    a movement performing device that performs a movement pattern in accordance with the movement pattern data specified by the first music information read from the storage device when the recognizing device recognizes the first music information.

2. A robot according to claim 1, wherein the audible sound signal is a ringer melody for a cellular phone.

3. A program, which a computer executes to realize a movement pattern control process for a robot, comprising the steps of:
    (a) inputting, as an audible sound signal, a music information file comprising first music information for specifying a movement pattern data or information directing the movement pattern data and a second music information for reproducing music;
    (b) analyzing the input audible sound signal to output a result of the analysis;
    (c) recognizing the first music information in accordance with the result of the analysis;
    (d) reading movement pattern data or information directing the movement pattern data in accordance with the recognized first music information from a storage device when the recognizing step (c) recognizes the first music information; and
    (e) outputting the read movement pattern data or information directing the movement pattern data to a movement performing device of the robot.

4. A program according to claim 3, wherein the reading step (d) reads the movement pattern data or information directing the movement pattern data in accordance with the recognized first music information from the storage device storing plural kinds of movement pattern data or plural kinds of information directing the plural kinds of movement pattern data, each of the plural kinds of movement pattern data or the plural kinds of information directing the plural kinds of movement pattern data corresponding to at least one of the plural kinds of the first music information.

5. A program according to claim 3, wherein
    the reading step (d) further reads, from the storage device, information directing performance tempo synchronized with reproduction tempo of the second music information and used by the movement performing device of the robot to perform the movement pattern in accordance with the first music information, and the outputting step (e) further outputs the read information directing performance tempo to the movement performing device of the robot.

6. A program according to claim 3, wherein the audible sound signal is a ringer melody for a cellular phone.

7. A program, which a computer executes to realize a movement pattern control process for a robot, comprising the steps of:
(a) inputting a result of the analysis of, as an audible sound signal, a music information file comprising first music information for specifying a movement pattern data or information directing the movement pattern data and a second music information for reproducing music;
(b) recognizing the first music information in accordance with the result of the analysis;
(c) reading movement pattern data or information directing the movement pattern data in accordance with the recognized first music information from a storage device when the recognizing step (b) recognizes the first music information; and
(d) outputting the read movement pattern data or information directing the movement pattern data to a movement performing device of the robot.

8. A program according to claim 7, wherein the reading step (c) reads the movement pattern data or information directing the movement pattern data in accordance with the recognized first music information from the storage device storing plural kinds of movement pattern data or plural kinds of information directing the plural kinds of movement pattern data, each of the plural kinds of movement pattern data or the plural kinds of information directing the plural kinds of movement pattern data corresponding to at least one of the plural kinds of the first music information.

9. A program according to claim 7, wherein
the reading step (c) further reads, from the storage device, information directing performance tempo synchronized with reproduction tempo of the second music information and used by the movement performing device of the robot to perform the movement pattern in accordance with the first music information, and
the outputting step (d) further outputs the read information directing performance tempo to the movement performing device of the robot.

10. A program according to claim 7, wherein the audible sound signal is a ringer melody for a cellular phone.

11. A music information file, comprising:
first music information that a robot can recognize by analyzing as an audible sound signal and that specifies a movement pattern data for making the robot perform a movement pattern; and
second music information for reproducing music.

12. A music information file according to claim 11, wherein the audible sound signal is a ringer melody for a cellular phone.

13. A server apparatus, comprising:
an accessing device that accesses a database storing a music information file comprising first music information that a robot can recognize by analyzing as an audible sound signal and that specifies a movement pattern data for making the robot perform a movement pattern and second music information for reproducing music;
a reading device that reads the music information file from the database via the accessing device in accordance with a request from a user; and
a transmitting device that transmits the read music information file via a communication network to the user or a communication terminal apparatus designated by the user.

14. A server apparatus according to claim 13, wherein the audible sound signal is a ringer melody for a cellular phone.

15. A communication terminal apparatus, comprising:
a requesting device that requests, to a server apparatus via a communication network, a music information file comprising first music information that a robot can recognize by analyzing as an audible sound signal and that specifies a movement pattern data for making the robot perform a movement pattern and second music information for reproducing music;
a receiving device that receives the requested music information file from the server apparatus via the communication network; and
a storage device that stores the received music information file.

16. A communication terminal apparatus according to claim 15, wherein the audible sound signal is a ringer melody for a cellular phone.

17. A music information reproducing apparatus, comprising:
a storage device that stores a music information file comprising first music information that a robot can recognize by analyzing as an audible sound signal and that specifies a movement pattern data for making the robot perform a movement pattern and second music information for reproducing music; and
a reproducing device that audibly reproduces the first and the second music information included in the music information file stored in the storage device.

18. A music information reproducing apparatus according to claim 17, wherein the audible sound signal is a ringer melody for a cellular phone.

* * * * *